US007564573B2

(12) United States Patent
Chung et al.

(10) Patent No.: US 7,564,573 B2
(45) Date of Patent: Jul. 21, 2009

(54) IMAGE FORMING APPARATUS

(75) Inventors: Kyung-shig Chung, Gyeonggi-do (KR); Han Cheol Young, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 998 days.

(21) Appl. No.: 10/602,636

(22) Filed: Jun. 25, 2003

(65) Prior Publication Data

US 2004/0095593 A1 May 20, 2004

(30) Foreign Application Priority Data

Nov. 20, 2002 (KR) ..................... 10-2002-0072404

(51) Int. Cl.
*G06F 15/00* (2006.01)
*G06K 1/00* (2006.01)

(52) U.S. Cl. ...................................... 358/1.12; 358/1.1

(58) Field of Classification Search .................. 358/1.1, 358/1.9, 1.11-1.18, 496, 497; 271/189, 207, 271/209, 220; 399/388
See application file for complete search history.

(56) References Cited

U.S. PATENT DOCUMENTS 5,580,041 A * 12/1996 Nakayama .................. 271/189
2002/0039508 A1* 4/2002 Tsusaka et al. ............. 399/401
2002/0159805 A1* 10/2002 Sato ........................... 399/405

FOREIGN PATENT DOCUMENTS

JP 06-191686 7/1994

OTHER PUBLICATIONS

Korean Office Action dated Aug. 31, 2004 in corresponding Korean Application No. 10-2002-0072404.

* cited by examiner

*Primary Examiner*—Dov Popovici
*Assistant Examiner*—Thierry L Pham
(74) *Attorney, Agent, or Firm*—Staas & Halsey LLP

(57) ABSTRACT

An image forming apparatus including a printing unit which prints an image on paper, an exit path which connects an exit of the printing unit to an exit member which pushes the paper outside of the printing unit, a plurality of guide members which are arranged widthwise of the paper, each guide member having a first guide side which guides the paper coming out of the printing unit along the exit path, wherein each guide member is installed to be movable such that the first guide side rotates when the first guide side contacts the paper which comes out of the printing unit, and returns to its original position after the paper completely passes through the printing unit.

28 Claims, 8 Drawing Sheets

IMAGE FORMING APPARATUS

CROSS-REFERENCE TO RELATED APPLICATIONS

This application claims the priority of Korean Patent Application No. 2002-72404 filed Nov. 20, 2002, in the Korean Intellectual Property Office, the disclosure of which is incorporated herein in its entirety by reference.

BACKGROUND OF THE INVENTION

1. Field of the Invention

The present invention relates to an image forming apparatus.

2. Description of the Related Art

FIG. 1 is a cross-sectional view of a conventional image forming apparatus and FIG. 2 is an exploded cross-sectional view of a portion A of the image forming apparatus of FIG. 1.

Referring to FIGS. 1 and 2, the image forming apparatus includes a printing unit 10, an exit path 20, and a reverse path 30. A guide member 40, which has a first side 41 and a second side 42, is installed at a point where the exit path 20 meets the reverse path 30. Paper stacked in a paper cassette 80 is input into the printing unit 10 by means of a pickup roller 90 and a feed roller 60. The printing unit prints an image on the paper. The paper on which the image is printed by the printing unit 10 passes through the first side 41 of the guiding member 40, is guided toward the exit path 20, and is then released onto an exit tray 55 by a rotating exit roller 50. The reverse path 30 reverses the paper, one surface of which has an image printed thereon, so that an image can be printed on the other surface and then supplies the paper to the printing unit 10. The reverse path 30 is branched out from the exit path 20 and extends to the feed roller 60.

The printing unit 10 makes it so the paper, to which toner adheres by an electrostatic force, passes between a heating roller 71 and a pressure roller 72, so that the toner is fixed onto the paper. Such a process is an image fixing process which is the final process performed by the printing unit 10 to form an image on paper using electrophotography.

FIG. 2 illustrates the heating roller 71 and the pressure roller 72, which make up of a fixing unit 70. The paper passing between the heating roller 71 and the pressure roller 72 contacts the first side 41 of the guide member 40. Since the guide member 40 is fixed, the paper is guided toward the exit path 20, being bent along the first side 41. In this respect, if the paper repeatedly contacts the first side 41, miniscule shreds of paper, toner residue, and dust stick to the first side 41.

A process in which the toner residue sticks to the first side 41 will now be described. In the process, paper, one surface of which has an image or text printed thereon, is provided. When the paper passes through the fixing unit 70 and heat and pressure are applied to the paper, the toner fixed to the surface melts and becomes soft. In this case, if the paper contacts the first side 41, the paper's surface rubs against the first side 41 and the toner fixed on the paper adheres to the first side 41. Such a phenomenon is more serious during duplex printing. This is because one surface of the paper which has an image printed thereon is again input into the printing unit 10 along the reverse path 30 and again heated by the fixing unit 70 before heat, which was applied to the paper by the fixing unit 70, has been completely cooled.

If toner waste or miniscule shreds of paper is continuously accumulated on the first side 41, there is a higher possibility for a paper jam to occur when paper passes through the first side 41. In other words, when toner is irregularly accumulated on the first side 41 to form irregular toner build-up thereon, the top of the paper may not smoothly pass by the first side 41 due to being caught on the irregular toner build-up.

Meanwhile, the guide member 40 is installed adjacent to the fixing unit 70, as shown in FIG. 2, and is thus maintained at a higher temperature by the heated fixing unit 70 than other elements of the image forming apparatus. Toner is typically formed of colorant resin and thus may be sticky when the toner is not completely cooled. Therefore, if paper rubs strongly against the first side 41 to which toner is adhered, a paper jam may also be caused.

Also, the paper jam may occur in the exit path 20. As mentioned above, toner sticking to the first side 41 is softened by the heat of the fixing unit 70 and thus may be separated from the first side 41 and adhere to the top of the paper when the top of the paper rubs on the first side 41. When the top of the paper rubs against a highest point B of the exit path 20, the course of the paper changes and the toner adhering to the top of the paper may rub off onto the highest point B at this time. If the toner continuously sticks to the highest point B, the top of the paper becomes caught by the highest point B, and as a result, paper jams may occur.

To prevent the occurrence of a paper jam, it has been suggested to install a plurality of idle rollers (not shown), which rotate when paper contacts these rollers, at the first side 41 of the guide member 40. However, the installation of the idle rollers increases the number of elements in manufacturing an image forming apparatus, thereby increasing the manufacturing costs.

SUMMARY OF THE INVENTION

Accordingly, it is an aspect of the present invention to provide an image forming apparatus that is designed to reduce the intensity of friction force generated when paper rubs against a guide member, thereby preventing toner from being separated from paper and adhering to a path which the paper follows.

Additional aspects and advantages of the invention will be set forth in part in the description which follows and, in part, will be obvious from the description, or may be learned by practice of the invention.

The foregoing and/or other aspects of the present invention are achieved by providing an image forming apparatus including: a printing unit which prints an image on paper, an exit path which connects an exit of the printing unit to an exit member which pushes the paper outside of the printing unit, and a plurality of guide members which are arranged widthwise of the paper, each guide member having a first guide side which guides the paper coming out of the printing unit along the exit path, wherein each guide member is installed to be movable such that the first guide side rotates when the first guide is contacted by the paper coming out of the printing unit, and returns to its original position after the paper completely passes through the printing unit.

The apparatus further includes a reverse path which branches out of the exit path between the exit of the printing unit and the exit member, so that the direction of the movement of the paper, which moves backward along the exit path, is reversed and again supplied into the printing unit when the exit member rotates in a reverse direction, wherein each guide member further comprises a second guide side which guides the paper, which goes backward along the exit path, along the reverse path.

In an aspect of the present invention, the apparatus further comprises a plurality of auxiliary guide members between the guide members, each auxiliary guide member including a first side and a second side, the first side being formed to be more distant from the rear side of paper than the first guide side and the second side being lower than the second guide side.

In yet another aspect of the present invention, the guide members pivot independently from one another.

In yet another aspect of the present invention, the guide members pivot together.

In yet another aspect of the invention, first stoppers are formed in the same direction as the pivoting direction of the guide members and respectively contact the guide members to be a predetermined distance away from the guide members.

BRIEF DESCRIPTION OF THE DRAWINGS

The above and/or other aspects and advantages of the invention will become apparent and more readily appreciated from the following description of the preferred embodiments, taken in conjunction with the accompanying drawings of which.

DETAILED DESCRIPTION OF THE INVENTION

Figure 1:
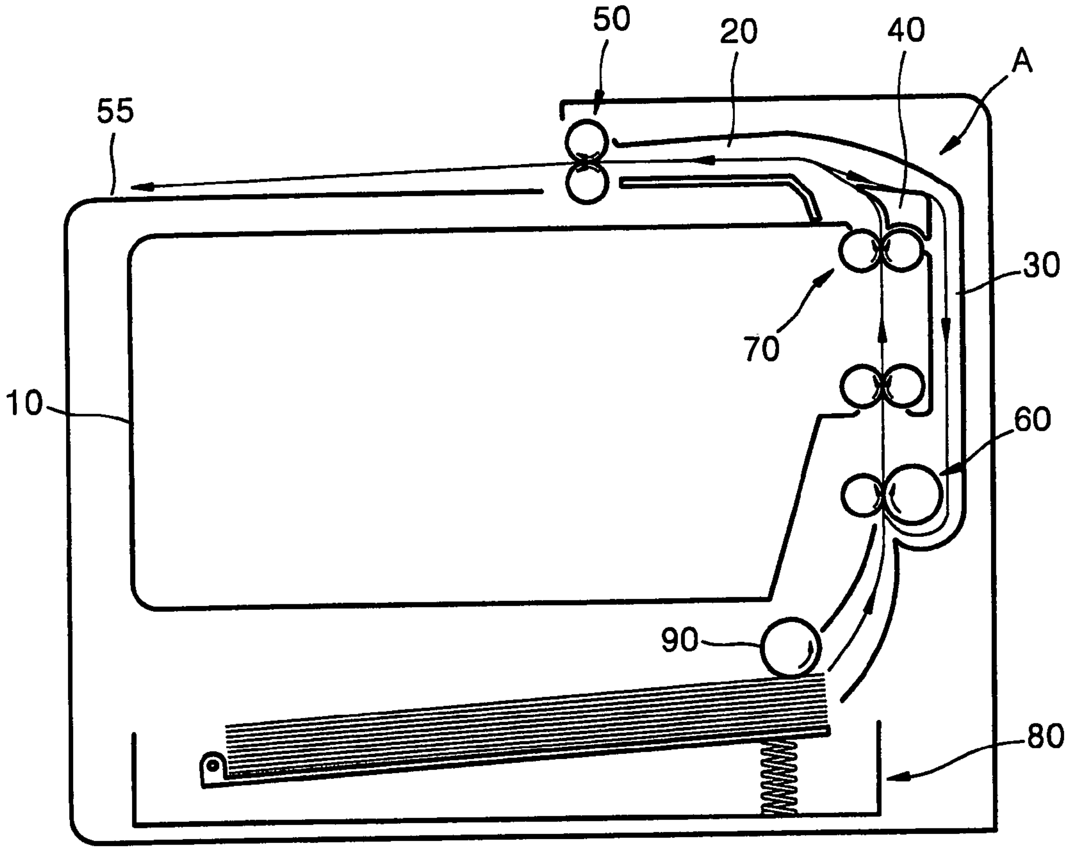
FIG. 1 (PRIOR ART)
FIG. 1 is a cross-sectional view of a conventional image forming apparatus.
Figure 2:
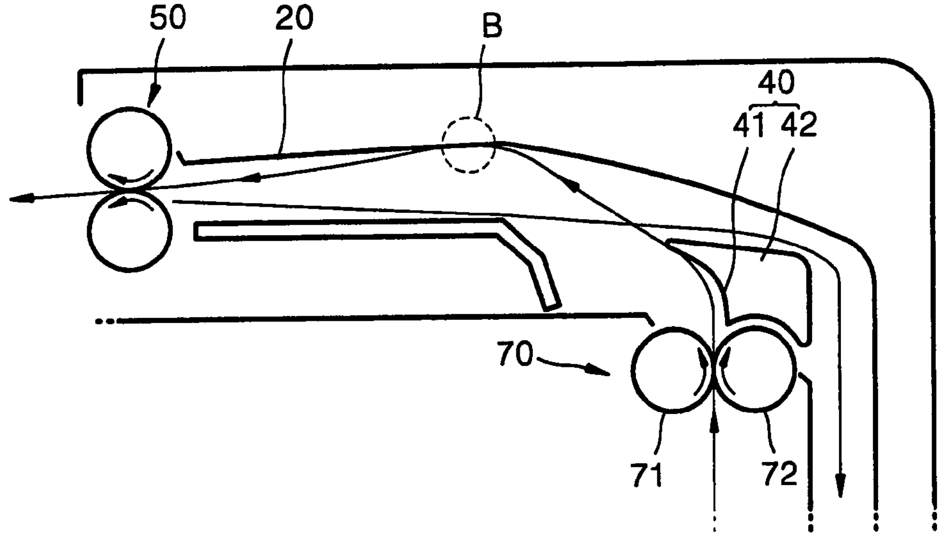
FIG. 2 (PRIOR ART)
FIG. 2 is a cross-sectional view of a portion A of the image forming apparatus shown in FIG. 1.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
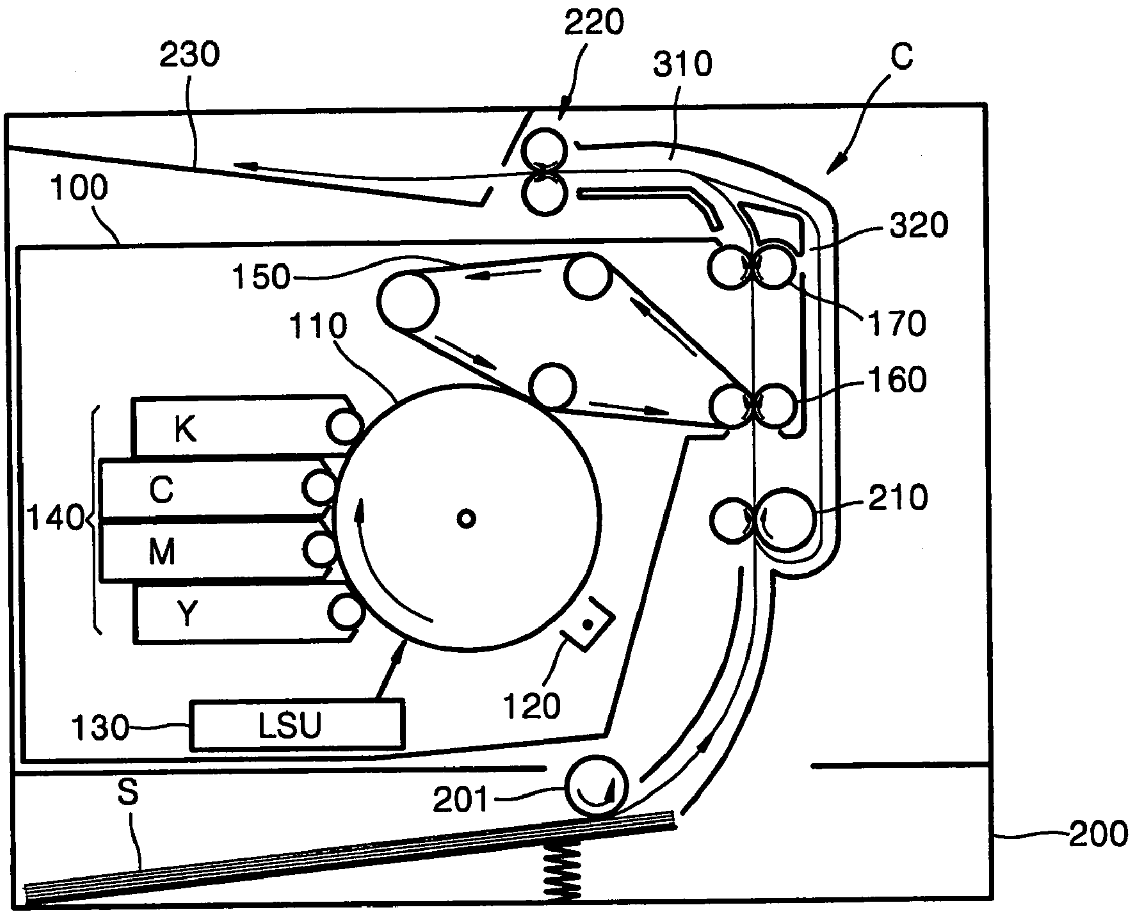
FIG. 3 is a cross-sectional view of an image forming apparatus according to an embodiment of the present invention.
Figure 4:
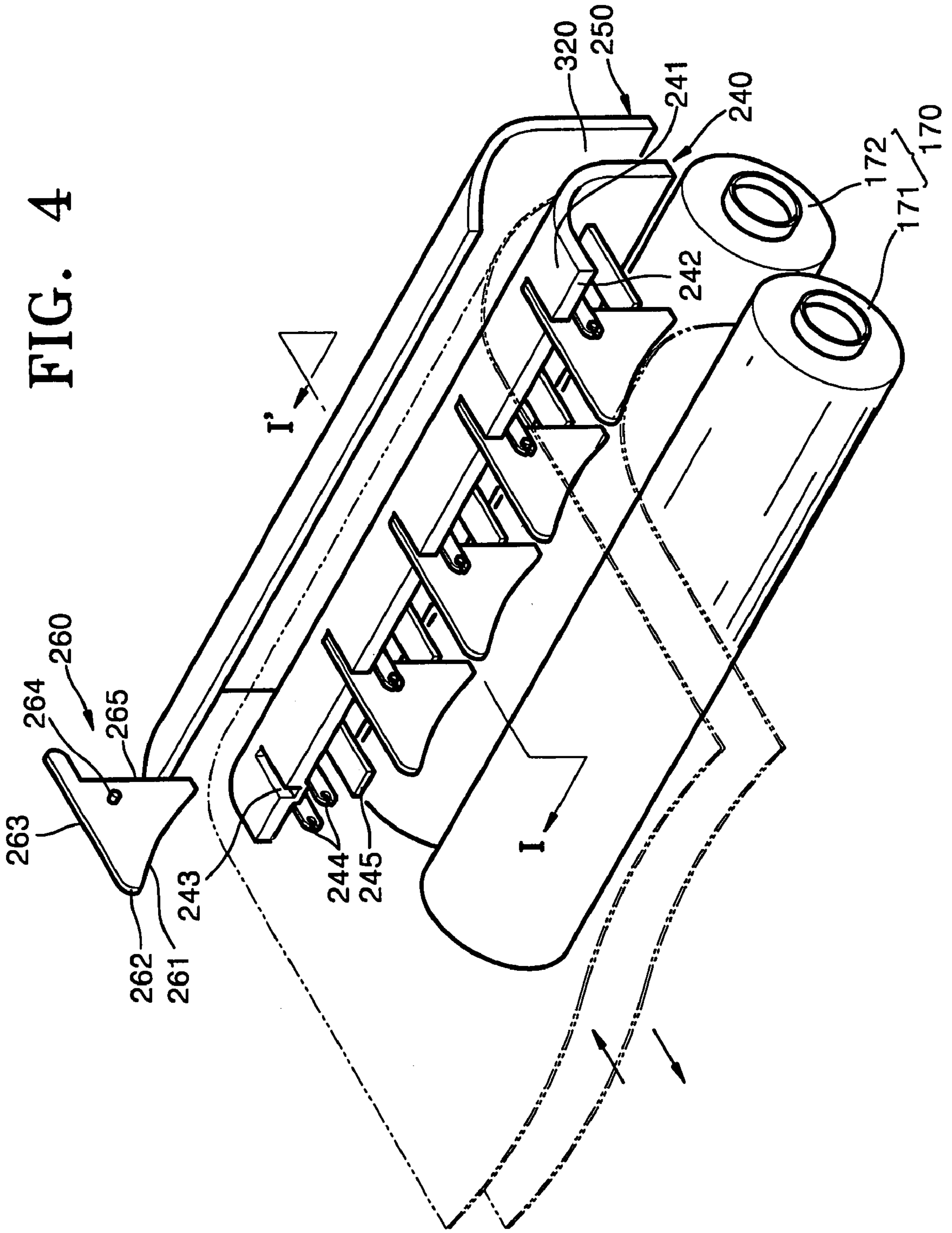
FIG. 4 is a perspective view of a portion C of the image forming apparatus shown in FIG. 3.
Figure 5:
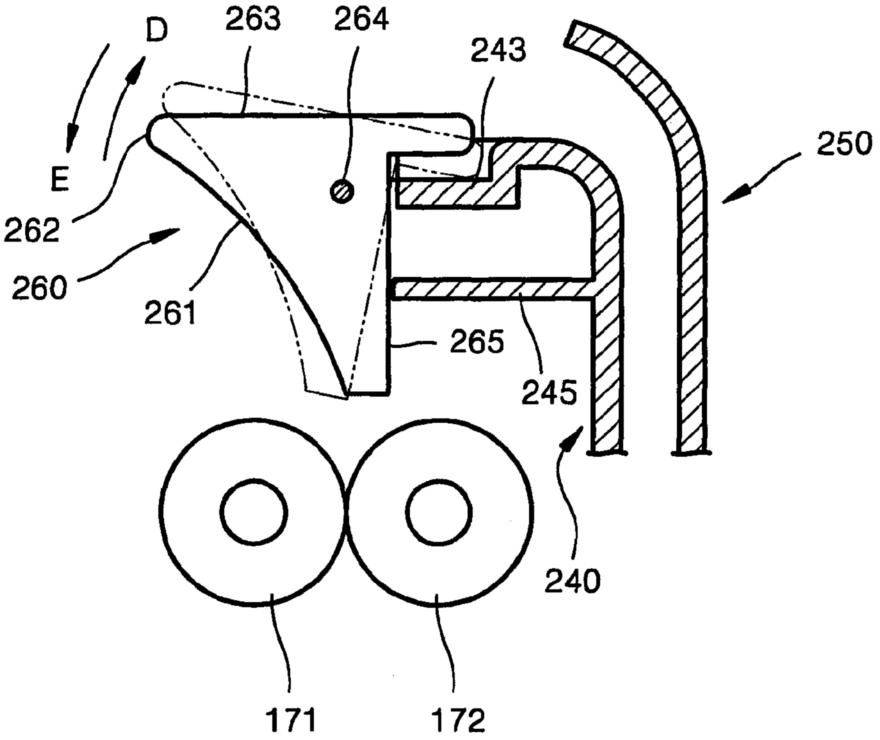
FIG. 5 is a cross-sectional view of FIG. 4, taken along the line I-I'.

FIG. 3 is a cross-sectional view of an image forming apparatus according to an embodiment of the present invention. FIG. 4 is a perspective view of a portion C of the image forming apparatus of FIG. 3. FIG. 5 is a cross-sectional view of FIG. 4, taken along the line I-I'.

Referring to FIG. 3, the image forming apparatus includes a printing unit 100, an exit path 310, and a reverse path 320. Here, reference numerals 200, 201, and 210 denote a feeding cassette, a pickup roller, and a feed roller, respectively.

The printing unit 100 includes a charger 120, an laser scanning unit (LSU) 130, developing units 140 filled with developer, a transfer belt 150, a transfer roller 160, and a fixing unit 170. The printing unit 100 prints an image on paper or other recording media using electrophotography. In this embodiment, the printing unit 100 can print a color image on paper and thus includes four developing units 140K, 140C, 140M, and 140Y that are filled with developer in black K, cyan C, magenta M, and yellow Y, respectively.

A method of forming an image using the aforementioned printing unit 100 will now be briefly described. First, the charger 120 supplies electric charges to a photosensitive drum 110 so as to charge the photosensitive drum 110 with electricity so that the surface of the photosensitive 110 uniformly conducts electric charges. Next, exposure is performed by scanning light, which corresponds to information regarding the yellow developer Y, for example, on a portion of the photosensitive drum 110 using the LSU 130. Then, a yellow latent electrostatic image is formed due to the differences in electric potential of the portion where the light is scanned and electric potentials of the other portions. Next, the developer 140Y supplies the yellow developer Y to the latent electrostatic image to develop the latent electrostatic image and form a yellow toner image. The yellow toner image is transferred to the transfer belt 150.

After the transfer of the yellow toner image, magenta, cyan, and black toner images are sequentially transferred to the transfer belt 150 using the developer in magenta M, cyan C, and black K, so that these toner images overlap the yellow toner image. As a result, a color toner image is formed on the transfer belt 150. The color toner image is then transferred onto paper S passing between the transfer belt 150 and the transfer roller 160, and heat and pressure are applied to the paper S so as to fix the color toner image onto the paper S, thereby obtaining a color image.

An image forming apparatus according to this embodiment is explained to adopt a printing unit which includes a photosensitive drum and an LSU, and prints an image using a multi-path method. However, the present invention is not limited to this printing unit. For instance, a printing unit which prints an image using photolithography may be adopted.

The exit path 310 connects an exit of the printing unit 100 and an exit member and forms a path through which the paper S, on which an image is printed, is released onto an exit tray 230. In general, the exit of the printing unit 100 corresponds to an exit of the fixing unit 170. In this embodiment, a pair of rotating exit rollers 220, being engaged with each other, are used as the exit member.

Through the reverse path 320, paper S, one surface of which has an image printed thereon, is reversed to print an image on the other surface and supplied to the printing unit 100. The reverse path 320 is branched out of the exit path 310 and extends to the feed roller 210 through which paper S is supplied to the printing unit 100.

A driving unit (not shown) may be installed along the exit path 310 and the reverse path 320 to feed the paper S.

Referring to FIGS. 4 and 5, the fixing unit 170 includes a heating roller 171 and a pressure roller 172. Above the pressure roller 172 is a first frame 240 installed in the direction of the width of the paper S. The first frame 240 forms the reverse path 320 together with a second frame 250, which is slightly distanced away from the first frame 240. It is an aspect of the invention that the reverse path 320 is extended to the feed roller 210.

A plurality of guide members 260 are attached to the first frame 240 such that they can pivot in predetermined directions while being fixed by the first frame 240. The guide members 260 include a first guide side 261 which guides paper discharged out of the printing unit 100 toward the exit path 310, and a second guide side 263 which guides paper traveling backward toward the exit path 310 to the reverse path 320.

The first guide side 261 reaches from the exit of the fixing unit 170 to the exit path 310. The first guide side 261 may assume a straight-line shape or a gentle curve. The second guide side 263 is formed to reach from an end 262 of the first guide side 261, which faces the exit path 310, to the reverse path 320. It is an aspect of the invention that the second guide side 263 is slightly higher than an upper surface 241 of the first frame 240.

Axes 264 are formed at both surfaces of the guide member 260 to be engaged with combiners 244 attached to the first frame 240, respectively. Therefore, the guide members 260 pivot with respect to the axis 264 in predetermined directions, while being fixed by the first frame 240. In an aspect of the present invention, the number of the guide members 260 is at least two. In this embodiment, five guide members 260 are connected with the first frame 240.

Figure 6:
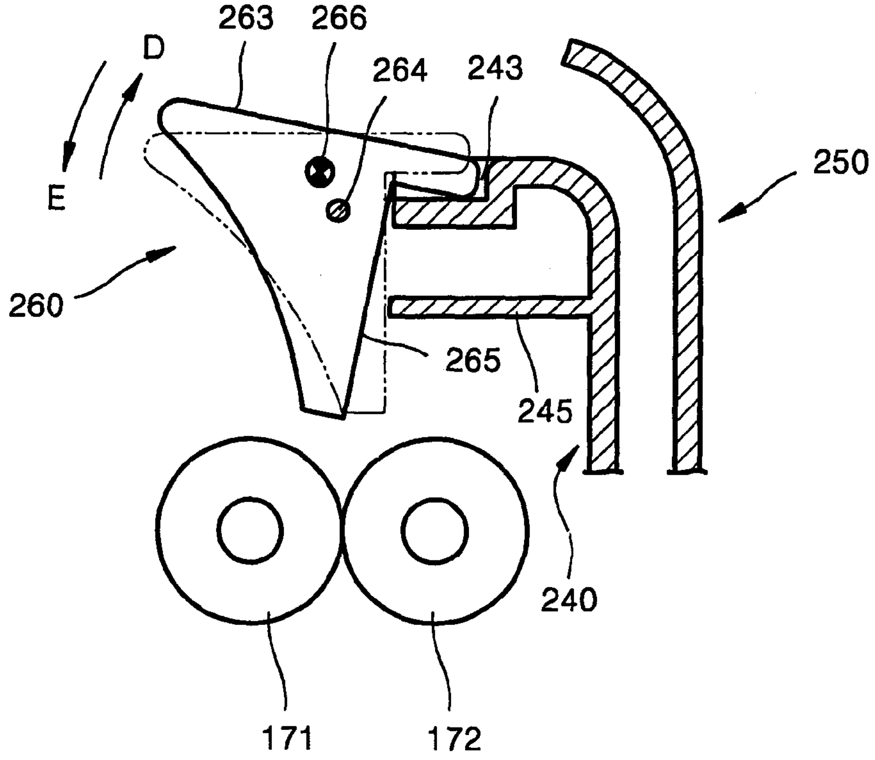
FIG. 6 is a cross-sectional view of FIG. 4 in which a guide member pivots, taken along the line I-I'.

It is preferable that the second guide side 263 reaches from an end 242 of the first frame 240 to the reverse path 320. Recessed portions 243 are formed in the end 242 of the first frame 240 so that movement of the second side 263 of the guide members 260 is not hindered by the end 242. As shown in FIG. 6, when the guide members 260 pivot slightly with respect to the axis 264 in a direction D, the guide members 260 contact the recessed portion 243. The recessed portion 243 is a first stopper that prevents the guide members 260 from excessively pivoting in the direction of an arrow D beyond a range for which paper is to be guided along the exit path 310.

To make the guide members 260 pivot slightly in the direction of the arrow D and then return to the original position, it is preferable that the guide member 260 is combined with the first frame 240 to have a tendency of pivoting in a direction E. Therefore, when the guide members 260 reach a point where they contact the recessed portion 243 and thus cannot go forward in the direction D, the guide members 260 must be installed to have the center 266 of gravity in the left direction with respect to the axis 264 in FIG. 6.

Figure 7:
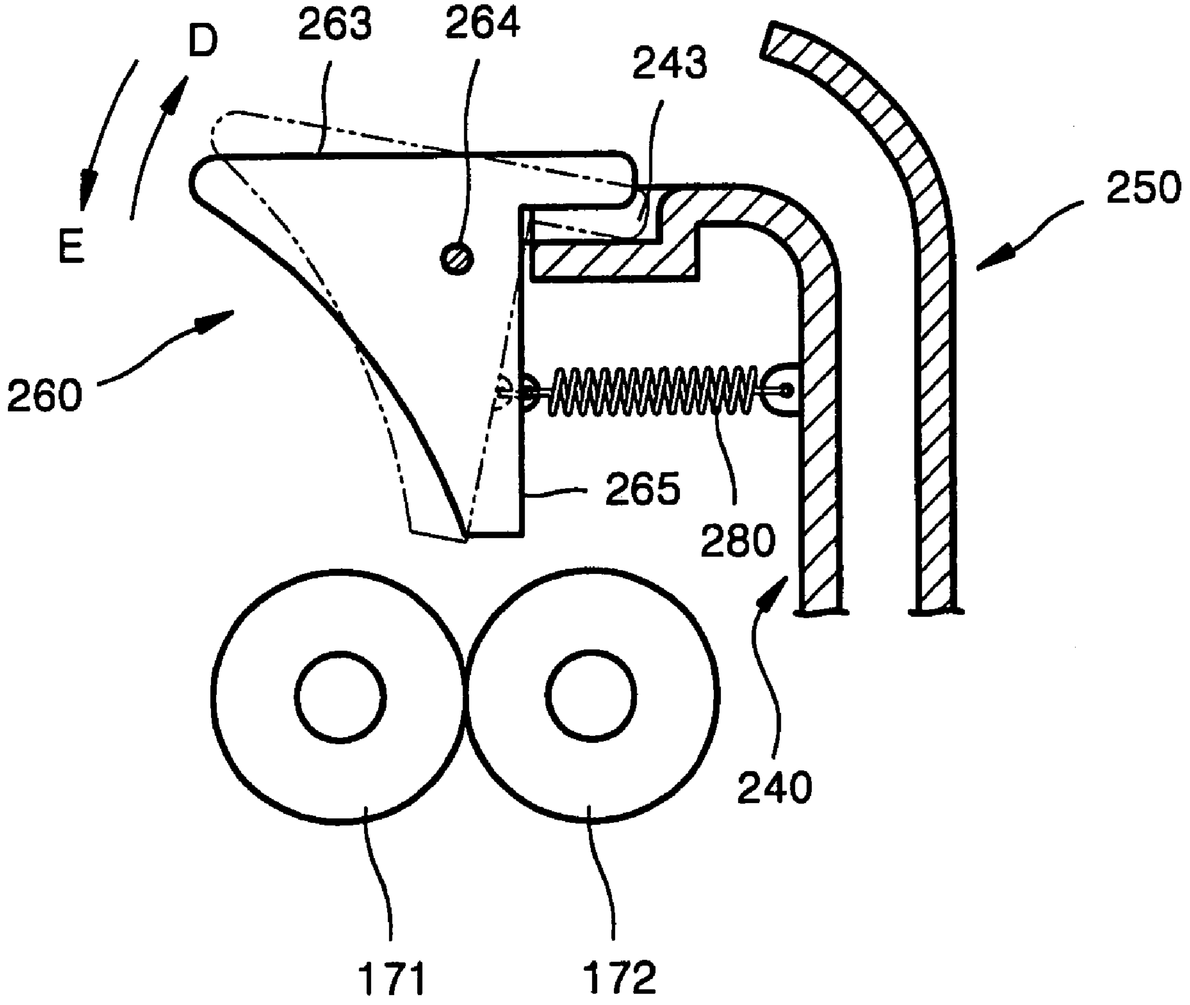
FIG. 7 is another embodiment of the present invention in which a pivoted guide member returns to the original position.

Otherwise, as shown in FIG. 7, a tension coil spring 280 may be further installed as an elastic member which connects the guide member 260 to the first frame 240 in order to make the guide members 260 pivot slightly in the direction D and then return to the original direction.

Also, as shown in FIG. 4, the first frame 240 may further include a second stopper 245 to prevent the guide members 260 from excessively moving in the direction of an arrow E beyond the range for which paper is to be guided along the exit path 310. Referring to FIGS. 4 and 5, the second stopper 245 contacts right sides of the guide members 260 when the guide members 260 pivot in the direction of the arrow E in order to return to the original position, thereby enabling the guide members 260 to precisely stop at the original position.

Figure 8:
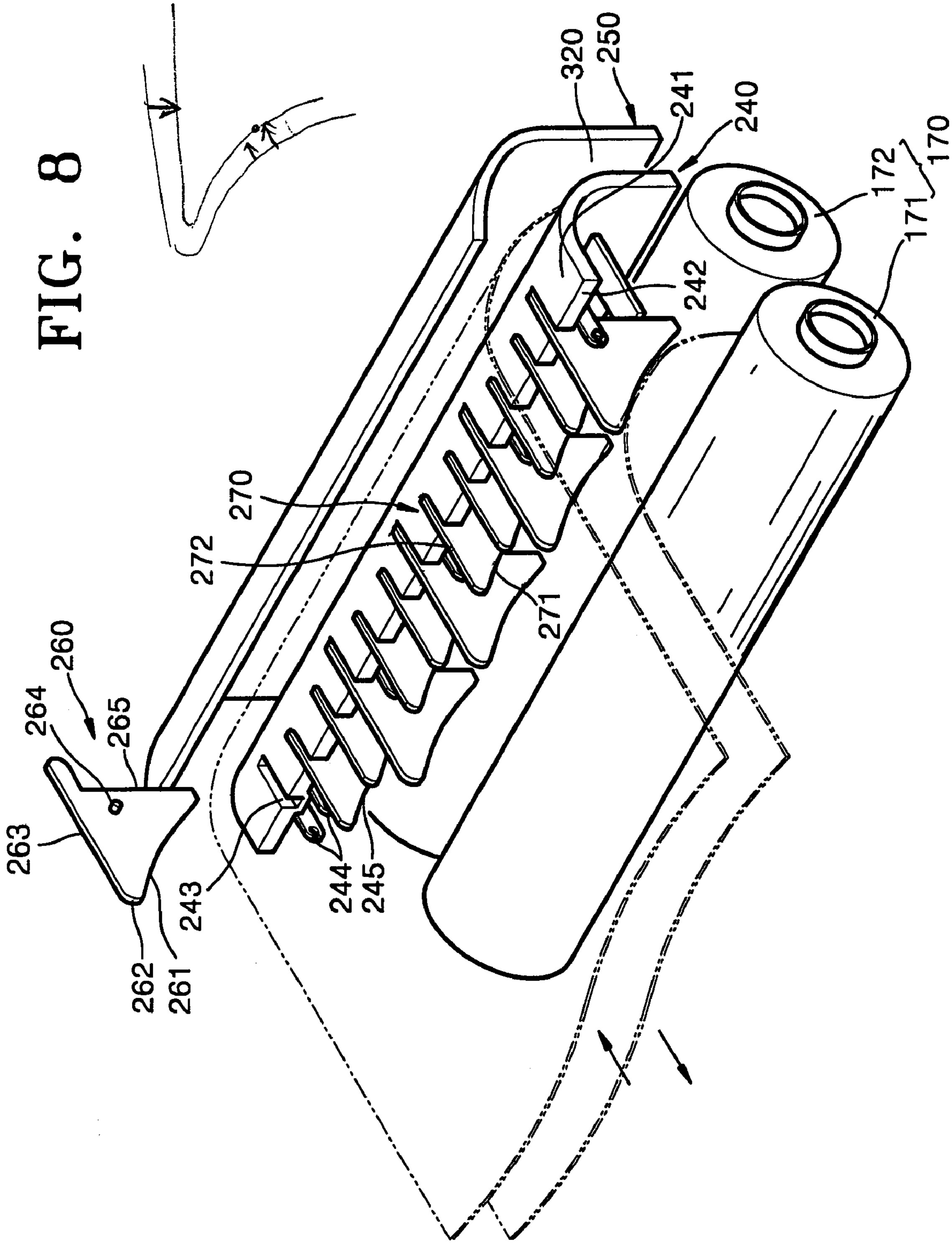
FIG. 8 is a cross-sectional view of an image forming apparatus according to another embodiment of the present invention.

Further, a plurality of auxiliary guide members may be installed between adjacent guide members 260 as shown in FIG. 8. The auxiliary guide members may be formed as ribs 270 of the first frame 240. Each of the ribs 270 includes a first side 271 which is positioned to be more distant from the rear surface of paper than the first guide side 261, and a second side 272 which is lower than the second guide side 263. The first and second sides 271 and 272 help the first and second guide sides 261 and 263 guide paper such that the paper moves smoothly forward along the exit path 310 or backward along the reverse path 320.

Figure 9:
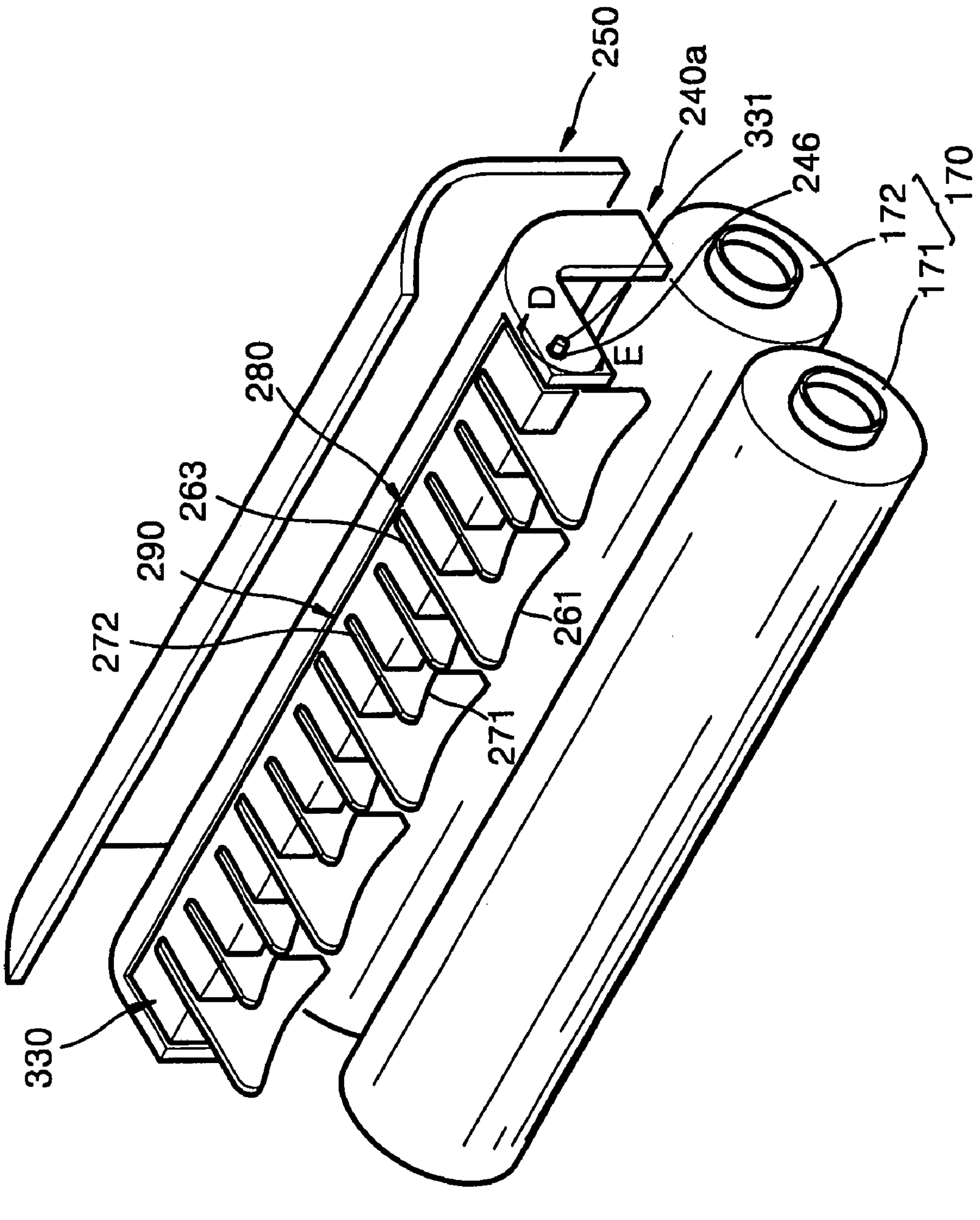
FIG. 9 is a cross-sectional view of an image forming apparatus according to still another embodiment of the present invention.

In this embodiment, the plurality of guide members 260 are installed to pivot independently with one another, but may be installed differently as shown in FIG. 9. FIG. 9 is a cross-sectional view of an image forming apparatus according to still another embodiment of the present invention. Referring to FIG. 9, a plurality of ribs 280 and a plurality of ribs 290 are combined with a moving member 330. Each of the ribs 280 has a first guide side 261 and a second guide side 263, and each of the ribs 290 has a first side 271 and a second side 272. Axes 331 are formed at both ends of the moving member 330 to be widthwise. Combiners 246 are formed at both ends of a first frame 240*a*. If the moving member 330 is installed in the first frame 240*a* in this manner, it is possible to make the moving member 330 move in a direction of an arrow D or E when the paper contacts the moving member 330. Although not shown in the drawings, it is an aspect of the invention that an image forming apparatus according to this embodiment includes first and second stoppers.

Hereinafter, a method of releasing and reversing paper, according to an embodiment of the present invention, will be described with reference to FIGS. 3-8, 10, and 11.

The feed roller 210 leads paper, which is picked up from the feeding cassette 200 by the pickup roller 201, to enter the printing unit 100. As mentioned above, in the printing unit 100, the photosensitive drum is charged with electricity, and then exposure, development, transfer of an image, and fixation of the image are sequentially performed on the paper. Next, the paper is released to be outside of the printing unit 100.

Figure 10:
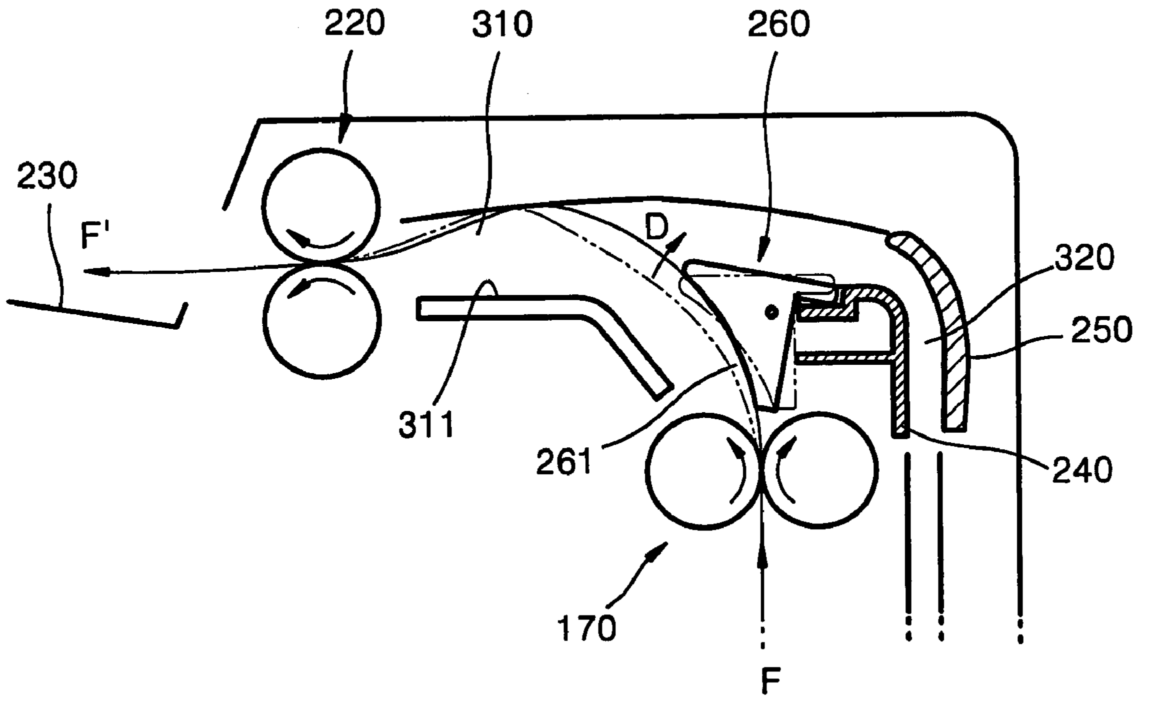
FIGS. 10 and 11 are cross-sectional views of the image forming apparatus of FIG. 3 illustrating a method of releasing and reversing paper according to an embodiment of the present invention.

Referring to FIG. 10, when the released paper contacts the first guide side 261, the paper is bent and guided toward the exit path 310. In this case, the guide members 260 are pushed out by the paper and then slightly pivoted with respect to the axes 264 in the direction of the arrow D. The movement of the guide members 260 in the direction of the arrow D results in a balance between the restorability force of the guide members 260 in the direction of the arrow E (see FIGS. 5 and 7) and a force applied to the first guide side 261 when the paper is bent during the guiding of the paper toward the exit path 310. If the guide members 260 pivot in the direction of the arrow D to an extreme, the paper will not be guided toward the exit path 310. Therefore, the recessed portions 243 (FIG. 4) are formed to contact the guide members 260 when the guide members reach a predetermined point, thereby controlling the extent of the rotation of the guide members 260. When the top of the paper approaches a point between the exit rollers 220, the exit rollers 220 push out the paper onto an exit tray 230. After the top of the paper is inserted between the exit rollers 220, the paper is tightened downward toward a lower surface 311 of the exit path 310, and thus, the guide members 260 pivot slightly in the direction of the arrow E (see FIG. 7). If the bottom of the paper completely passes through the first guide sides 261, the guide member 260 rotates in the direction of the arrow E because the center of gravity of the guide member 260 shifts in the left direction with respect to the axis 264 as shown in FIG. 6, or due to the elastic force of an elastic member. As a result, the right sides 265 of the guide members 260 contact the second stoppers 245, and thus, the guide members 260 return to the original positions. Unless the guide members 260 return to the original positions, the top of the paper, which goes backward along the exit path 310, is caught on the edge 262 of the first guide side 261 and cannot be thus guided along the exit path 320 during duplex printing, which will be explained later, thereby causing a paper jam.

Figure 11:
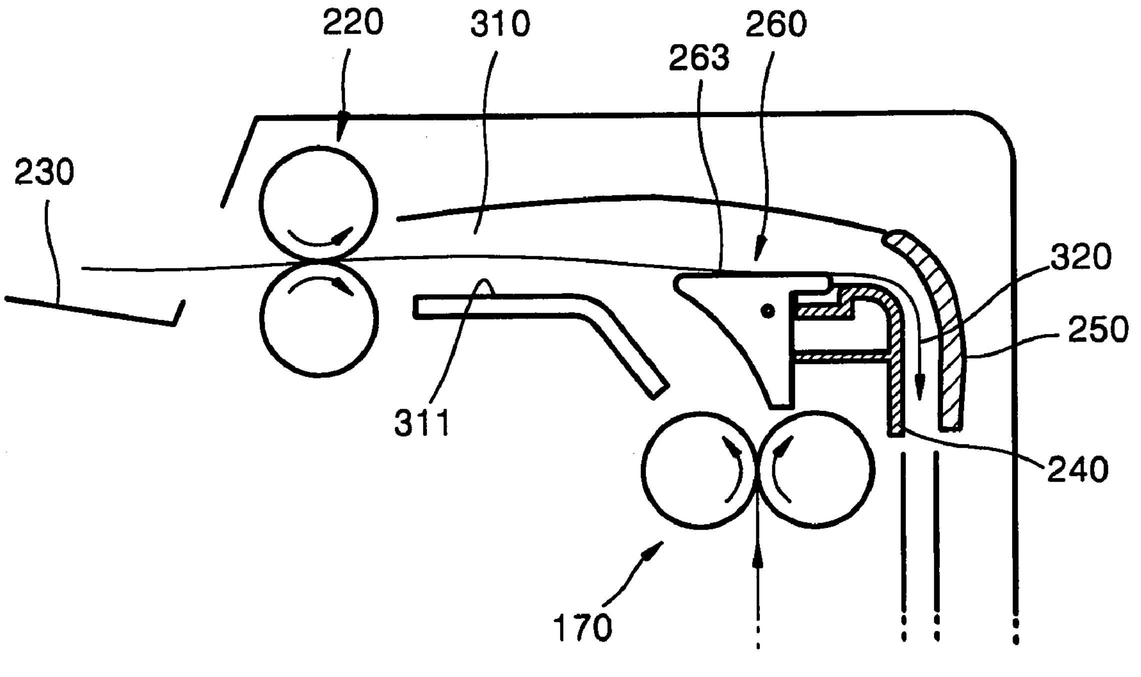

Next, duplex printing will be explained. As mentioned above, when an image is printed on one surface of a paper, the exit rollers 220 rotate in a reverse direction before the bottom of the paper comes out of the exit roller 220 and is pushed out onto the exit tray 230. Thus, the paper begins to go backward along the exit path 310. In this case, as shown in FIG. 11, because the guide members 260 have already returned to their original positions, the top of the paper smoothly contacts the second guide side 263, travels along the reverse path 320, and then passes through the printing unit 100. An image is printed on the other surface of the paper in the printing unit 100. Next, the paper passes along a path F-F' shown in FIG. 10 and is then pushed out onto the exit tray 230.

As mentioned above, the guide members 260 pivot and balance themselves with a force applied by the paper. Accordingly, the direction of the movement of the top of the paper along the first guide side 261 can be smoothly changed, and the paper is guided toward the exit path 310, thereby reducing the magnitude of a force of friction formed between the other surface of the paper and the first guide side 261. In a case where one-sided surface image printing or duplex printing is performed on a paper, toner, which is fixed on the one surface of the paper to form an image thereon, melts again by heat applied from the fixing unit 170. In the case of the related art, the melting toner would rub against a first side of a guide member, be removed from the paper, and again stick to the first side, thereby causing a paper jam. However, according to the present invention, the guide members 260 pivot to eliminate force applied by the paper, thereby reducing the friction of paper against the first guide side 261 to a greater degree than in the conventional image forming apparatus of FIG. 1. Therefore, it is possible to more effectively prevent toner from sticking to the first guide side 261. Further, even if a paper jam occurs around the guide members 260, the movement of the guide members 260 in predetermined directions enables paper, which causes the paper jam, to be more easily removed than in the conventional image forming apparatus of FIG. 1.

Up to this point, various types of image forming apparatuses according to the embodiments of the present invention that include an exit path and a reverse path, respectively, and that can perform duplex printing, have been explained. However, if movable guide members are installed in an image forming apparatus although the reverse path is not formed therein, the friction of paper against a first guide side can be reduced. Accordingly, it is also possible to prevent the occurrence of a paper jam caused by the use of paper, where one surface is printed with an image.

An image forming apparatus according to the present invention has some advantages: (i) even if duplex printing is performed or paper with one surface having a printed image is used, it is possible to effectively prevent the occurrence of a paper jam caused when a toner image formed at the other surface melts by heat applied from a fixing unit and the toner sticks to a course of the paper; (ii) additional elements such as an idle roller are not required to reduce the friction of paper against first guide sides of guide members, thereby reducing manufacturing costs; and (iii) paper, which causes paper jams, can be easily removed with the use of movable guide members.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus comprising:

a printing unit which prints an image on paper;

an exit member to push the paper out of the image forming apparatus;

an exit path which connects an exit of the printing unit to an exit member which pushes the paper outside of the printing unit;

a plurality of guide members arranged widthwise of the paper, each guide member having a first guide side to guide the paper coming out of the printing unit along the exit path, wherein when the first guide side is contacted by the paper coming out of the printing unit, each of the plurality of guide members rotate in a first direction and balance themselves with a force applied by the paper, and returns to an original position by rotating in a second direction opposite to the first direction after the paper completely passes through the printing unit; and a reverse path which branches out of the exit path between the exit of the printing unit and the exit member, so that the direction of the movement of the paper, which moves backward along the exit path, is reversed and again supplied into the printing unit when the exit member rotates in a reverse direction, wherein each guide member further comprises a second guide side which guides the paper, which goes backward along the exit path, along the reverse path.

2. The apparatus of claim 1, further comprising a plurality of auxiliary guide members between the guide members, each auxiliary guide member including a first side and a second side, the first side being more distant from the rear side of paper than the first guide side and the second side being lower than the second guide side.

3. The apparatus of claim 1, wherein the guide members pivot independently from one another.

4. The apparatus of claim 1, wherein the guide members pivot together.

5. The apparatus of claim 1, further comprising first stoppers formed in the same direction as the pivoting direction of the guide members and respectively contact the guide members to be a predetermined distance away from the guide members.

6. The apparatus of claim 1, further comprising second stoppers which control the extent of the pivoting action of the guide members so that the guide members do not pivot beyond the original positions when the guide members return to the original positions thereof.

7. The apparatus of claim 1, wherein the guide members return to the original positions thereof due to own weights thereof when the paper passes by the guide members.

8. The apparatus of claim 1, further comprising elastic members which apply elastic force to the guide members to make the guide members return to the original positions thereof.

9. The apparatus of claim 1, further comprising a plurality of auxiliary guide members between the guide members, each auxiliary guide member including a first side more distant from the rear surface of paper than the first guide side.

10. The apparatus of claim 1, further comprising:

a first frame on which the plurality of guide members are movably connected; and a second frame positioned adjacent to a side of the first frame opposite to the plurality of guide members and forming the reverse path with the first frame.

11. The apparatus of claim 10, further comprising:

a feed roller positioned at the end of the reverse path to received the paper from the reverse path and feed the paper toward the printing unit to print an image on the reverse side thereof.

12. The apparatus of claim 1, wherein the plurality of guide members further comprise as second guide side to guide paper towards the reverse path.

13. The apparatus of claim 1, wherein the first guide side has a shape of a straight line.

14. The apparatus of claim 1, wherein the first guide side has a shape of a slight curve to direct the paper toward the exit member.

15. The apparatus of claim 12, wherein the second guide sides of the respective guide members are slightly higher than an upper surface of the first frame.

16. The apparatus of claim 10, further comprising plural pairs of combiners attached to the first frame, each pair of combiners movably connecting the respective guide member to the first frame.

17. The apparatus of claim 16, wherein the plural guide members each comprise axes formed at both surfaces thereof to engage with a respective combiner to movable attach the plural guide members to the first frame.

18. The apparatus of claim 17, wherein there are five guide members connected with the first frame.

19. The apparatus of claim 12, wherein the second guide side of each guide member extends from an end of the first frame toward the reverse path.

20. The apparatus of claim 19, further comprising recessed portions aligned with respective guide members and formed at end of the first frame such that movement of the second guide sides of the guide members are not restricted by the end of the first frame.

21. The apparatus of claim 9, wherein the auxiliary guide members are formed as ribs of the first frame.

22. The apparatus of claim 21, wherein each of the ribs comprises:

a first rib side positioned more distant from the rear surface of the paper than the first guide side to guide the paper in the forward path; and a second rib side positioned lower than the second guide side to guide the paper in the reverse path.

23. The apparatus of claim 20, wherein the guide members are formed to pivot towards the first frame.

24. The apparatus of claim 23, wherein the guide members have a center of gravity off center.

25. The apparatus of claim 1, further comprising tension coil springs each connected to a respective guide member and the first frame to force the guide members to pivot slightly when contacted by the paper and then return to an original position.

26. The apparatus of claim 19, further comprising first stoppers formed at end of the first frame such that movement of the second sides of the guide members are not restricted by the end of the first frame.

27. The apparatus of claim 20, further comprising second stoppers to prevent the guide members from excessively moving beyond the original position when returning thereto.

28. An image forming apparatus comprising:

a printing unit to print an image on a recording medium and forward the recording medium through the image forming apparatus;

a exit path member to rotate in a forward direction to push the recording medium out of the image forming apparatus;

a plurality of flexible guide members arranged widthwise of the paper, each flexible guide member having a first guide side, and each flexible guide member flexing in a first direction to guide the recording medium toward the exit path member and balance with itself with the force applied by the recording medium when the recording medium exits the printing unit and contacts the first guide side and returning to an original position by flexing in a second direction opposite to the first direction after the paper completely passes through the printing unit; and a reverse path which branches out of the exit path between the exit of the printing unit and the exit member, so that the direction of the movement of the paper, which moves backward along the exit path, is reversed and again supplied into the printing unit when the exit member rotates in a reverse direction, wherein each guide member further comprises a second guide side which guides the paper, which goes backward along the exit path, along the reverse path.

* * * * *